Jan. 8, 1935.  S. JOHNSON, JR., ET AL  1,987,256
LUBRICATING MECHANISM
Filed Nov. 25, 1931  3 Sheets-Sheet 1

INVENTORS.
STEPHAN JOHNSON, JR.
WILFRED A. EATON
BY
H. O. Clayton
ATTORNEY.

Jan. 8, 1935.  S. JOHNSON, JR., ET AL  1,987,256
LUBRICATING MECHANISM.
Filed Nov. 25, 1931  3 Sheets-Sheet 2

INVENTORS.
STEPHAN JOHNSON JR.
WILFRED A. EATON
BY
ATTORNEY

Jan. 8, 1935.    S. JOHNSON, JR., ET AL    1,987,256
LUBRICATING MECHANISM
Filed Nov. 25, 1931    3 Sheets-Sheet 3

INVENTORS.
STEPHAN JOHNSON, JR.
WILFRED A. EATON
BY
ATTORNEY.

Patented Jan. 8, 1935

1,987,256

UNITED STATES PATENT OFFICE 1,987,256

LUBRICATING MECHANISM

Stephen Johnson, Jr., and Wilfred A. Eaton, Pittsburgh, Pa., assignors to Bendix-Westinghouse Automotive Air Brake Company, Pittsburgh, Pa., a corporation of Delaware Application November 25, 1931, Serial No. 577,350

2 Claims. (Cl. 184—7)

This invention relates in general to lubricating mechanism and in particular to the so-called one-shot lubricating systems for automotive vehicles.

It is the principal object of the invention to provide such a lubricating system on a trailer structure and to render the system operative to lubricate the various bearings of the trailer by means of the conventional air brake system of the tractor and trailer. Such a combined brake and lubricating mechanism facilitates the lubrication of the trailer parts, which parts are somewhat inaccessible and unadapted to the one-shot lubricating systems now in vogue.

A further object of the invention is to provide a lubricator unit rendered operable by the compressed air of the air brake system, the operation of the unit being simultaneous with that of the brake system.

A further object is to provide such a unit so structurally designed as to be adapted for any one of electric, vacuum, mechanical or air operation, and which operation is effected in conjunction with the operation of either the brake or clutch mechanism of an automotive vehicle.

Yet another object is to provide a lubricator structure wherein a definite quantity of lubricant is metered to the several bearings with each actuation of the lubricator unit.

Other objects of the invention and desirable details of construction and combinations of parts will become apparent from a detailed description of certain embodiments of the invention, described in detail in the following specification taken in conjunction with the accompanying drawings illustrating said embodiments, in which.

Figure 3:
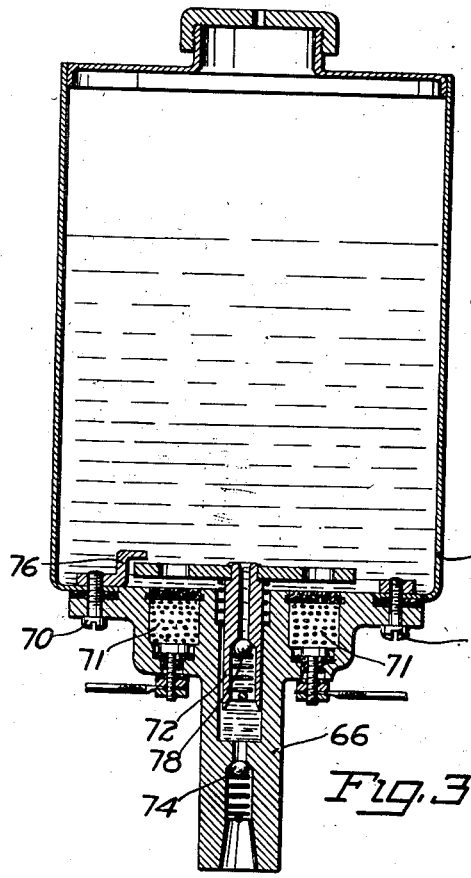
Figure 4:
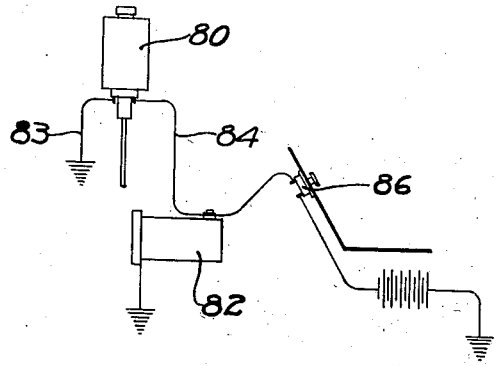
Figure 5:
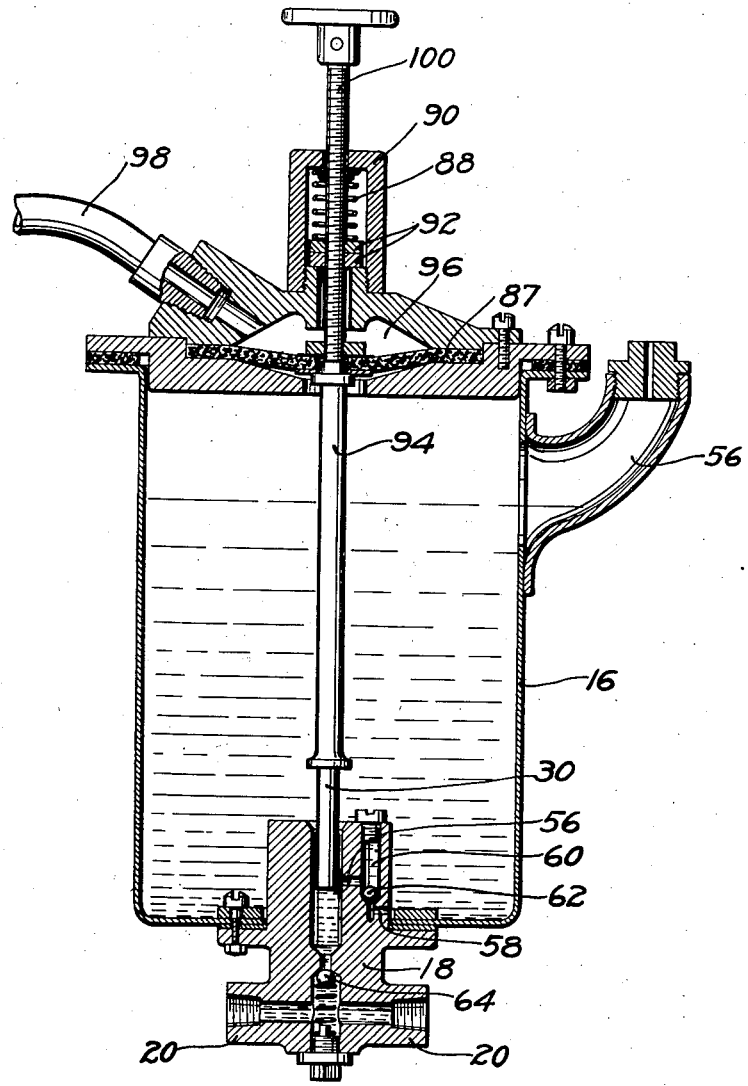

Figure 3 discloses another modified form of unit wherein the pump is electrically operated;

Figure 4 discloses the incorporation of the unit of Figure 4 in the electric starter system of an automotive vehicle; and Figure 5 discloses a modified form of lubricator unit adapted for both vacuum and manual operation.

Figure 1:
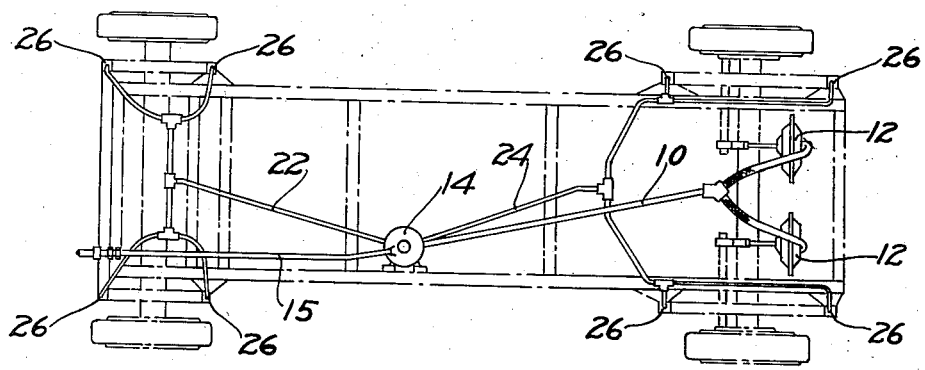
Figure 1 is a diagrammatic view of an air brake system for a conventional trailer shown in combination with a lubricating system for the trailer operable in conjunction with the brake system.
Figure 2:
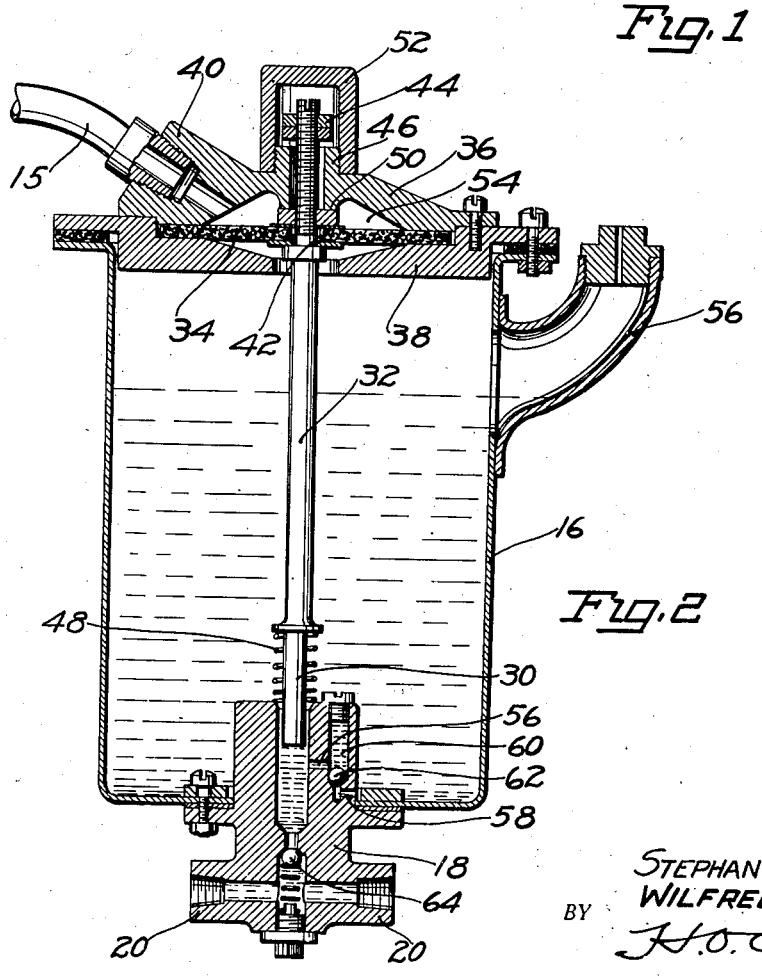
Figure 2 is a sectional view showing in detail the structure of the lubricator unit.

Referring now to the invention in detail and particularly to that embodiment disclosed in Figures 1 and 2, there is provided a relatively simple air brake system for a trailer comprising straight air line 10 for operating trailer brake chambers 12, the admission of air, to apply the brakes, being controlled by a manually operated brake valve located on the truck, not shown. A lubricator unit 14 of a one-shot lubricating system for the trailer is adapted to be rendered operative by the compressed air of the brake system, the unit being placed in circuit with the straight air line 10, as disclosed in Figure 1 and as more fully described hereinafter.

As disclosed in detail in Figure 2, the unit comprises a casing 16 constituting a mounting for both a pump and a power operated means for operating the pump; the casing likewise constitutes an oil reservoir for supplying lubricant to the pump. The pump for the lubricating system is located in the base of the casing and comprises a generally cylindrical casing 18 fitting within and detachably secured in an opening in the casing 16. The cylinder 18 is provided in its base portion with oppositely disposed outlet ports 20 for connection with the oil lines 22 and 24 extending to the various bearings of the trailer to be lubricated. These bearings may include the spring shackles 26, and any other conventional bearings in the trailer chassis structure the lubrication of which is desired. The cylinder 18 is bored to receive a pump plunger or piston 30, the operating or connecting rod 32 of which is extended to the upper portion of the reservoir casing 16 to be actuated by a flexible diaphragm 34. The diaphragm is preferably mounted between upper and lower plates 36 and 38 together forming a closure unit for the reservoir casing 16. The upper plate 36 is provided with a port 40 in circuit with the straight air line 10 as previously described.

The diaphragm 34 is clamped to the rod 32 at 42, and adjustably mounted lock nuts 44 on the upper end of the rod are adapted to contact a stop 46 and thus limit the downward movement of the rod to meter the lubricant forced to the bearings at a single stroke of the pump. The pump plunger and its connected diaphragm are returned to their inoperative position by spring 48, a stop 50 limiting this return movement. A cap 52, preventing leakage of air from pressure chamber 54, and a vent 56 in the side wall of the reservoir casing complete the mechanism for operating the pump.

With the structure described the lubricator unit is rendered operable with each application of the trailer brakes. Operation of the brake valve on the truck serves to admit compressed air to the brake service line 10 to apply the trailer brakes, and inasmuch as this line is in constant communication with the pressure chamber 54 via port 40 the diaphragm is flexed downwardly to operate the lubricator pump with each brake application. A portion of the oil in the pump cylinder is thus forced out into the lubricating lines, each bearing receiving its portion of lubricant with each application of the brakes. The length of the stroke of the plunger is adjusted to provide the correct amount of oil to the bearings based on an average number of brake applications, which may be calculated either on a daily or mileage basis.

Upon release of the brakes the chamber 54 above the diaphragm is vented to atmosphere permitting the return spring 48 to move the parts to their inoperative position. As the plunger 30 is moved upwardly a new charge of oil is drawn into the cylinder bore from the reservoir via conduits 56 and 58 and an auxiliary reservoir 60, a ball check valve member 62 being seated in the connection between the auxiliary reservoir 60 and conduit 58 to obviate loss of oil into the main reservoir on the working stroke of the pump plunger. A spring loaded ball check valve 64 is provided in the connection between the outlet ports 20 and the cylinder bore to obviate withdrawal of oil from the lines on the return stroke of the plunger and also permit the aforementioned recharging operation. The spring of the check valve 64 is made strong enough to prevent flow of oil from the reservoir to the lines under the action of gravity.

Figure 1A:
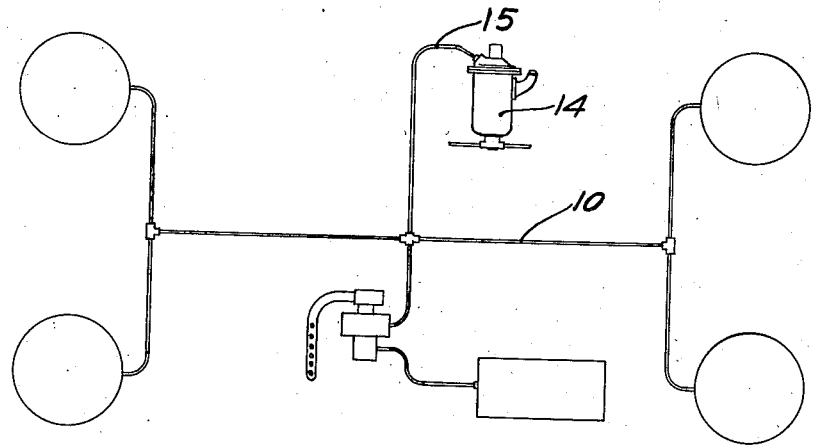
Figure 1A is a diagrammatic view disclosing the incorporation of the lubricator unit in the brake system of the truck or leading vehicle.

There is thus provided a very simple power operated brake and lubricating system, the two operations, namely, that of applying the brakes and lubricating the bearings, being carried out simultaneously and under the direct control of the operator by the operation of the control valve on the truck. A lubricator unit similar to that disclosed in Figure 2 may also be mounted on the truck and operate in conjunction with the truck brakes to lubricate the bearings of the truck. Such an arrangement is disclosed diagrammatically in Figure 1A.

It is likewise within the purview of the invention to operate the lubricator unit in conjunction with an electrically operated brake system, not shown. To this end a magnet may be arranged to operate the pump, which magnet is connected in the brake circuit and is rendered operative with each application of the brake controller.

Such an electrically operated pump is disclosed in detail in Figure 3 wherein a cast iron or other magnetizable pump body member 66, secured to the bottom of the casing 68 of the lubricating unit by fastenings 70, houses magnet winding 71 and a reciprocable spring pressed armature plunger 72.

When the electrically operated brakes are applied the winding 71 is energized to draw the armature member 72 downwardly thereby forcing a charge of lubricant, via discharge valve 74, into the lubricating lines. Release of the brakes permits the member 72 to be spring returned to a stop 76, a new charge of lubricant being admitted to the pump via an intake valve 78.

There is disclosed in Figure 4 an arrangement whereby the magnetically operated lubricator unit of Figure 3 may be operated with each operation of the conventional electric starter. To this end a lubricator unit 80 is connected in parallel with the starter motor 82 by leads 83 and 84, so that with operation of the starter switch 86 the pump is operated to lubricate the bearings. This arrangement is particularly advantageous, inasmuch as the bearings are lubricated prior to motion of the vehicle and, therefore, at a time when the loads upon the bearing and journaled parts are static.

The lubricator may also be vacuum operated, as disclosed in Figure 5, a diaphragm 87 being forced downwardly by a compression spring 88 interposed between the end of cap 90 and adjusting nuts 92 on a connecting rod 94. The spring 88 is compressed, with each application of the brakes, by virtue of the pressure of the atmosphere acting on the under side of the diaphragm member 87, the upper chamber 96 being evacuated via conduit 98 connected to any one of the well-known vacuum operated power brake actuators. With such a construction the lubricator pump is spring operated with each release of the brakes, the recharging return stroke of the pump being effected as the brakes are applied.

If desired, the connecting rod 94 may be continued through the cap 90 to provide a stub shaft 100 operable by the foot of the driver to effect a manual operation of the pump in case of failure of power.

It will be understood that while the illustrated embodiments of the invention are described as shown, a considerable latitude is to be permitted in construction within the scope of the appended claims.

We claim:

1. In an automotive mechanism comprising a truck and an attached trailer, said truck and trailer being provided with an air brake system for operation of brakes on the truck and trailer, a one-shot force feed lubricating system on said trailer adapted to effect a lubrication of a plurality of the bearings on the trailer, said system having a system lubricator unit, said unit being provided with a diaphragm operated pump, a support for said diaphragm limiting movement thereof during the delivery stroke of the pump, and means for conducting air under pressure to said diaphragm with each brake applying operation of the air brake system to effect power operation of said lubricator unit.

2. An automotive vehicle provided with an air brake mechanism having a straight air line and also provided with a combined master pump and reservoir of a one-shot force feed lubricating system for the vehicle, and pressure differential operated means cooperating with said pump and connected with said straight air line to be rendered operable by air under pressure, during the operation of the brake mechanism, to operate the pump of the lubricating system, said means including a diaphragm subjected to said air under pressure together with a support therefor limiting movement of said diaphragm in one direction.

STEPHEN JOHNSON, Jr.
W. A. EATON.

CERTIFICATE OF CORRECTION.

Patent No. 1,987,256.  January 8, 1935.

STEPHEN JOHNSON, Jr., ET AL.

It is hereby certified that error appears in the above numbered patent requiring correction as follows: In the signature to the drawings, the name of the first mentioned inventor should read Stephen Johnson, Jr. instead of "Stephan Johnson, Jr."; and that the said Letters Patent should be read with this correction therein that the same may conform to the record of the case in the Patent Office.

Signed and sealed this 19th day of March, A D. 1935.

Leslie Frazer (Seal)  Acting Commissioner of Patents.